(12) United States Patent
Miura et al.

(10) Patent No.: US 7,440,623 B2
(45) Date of Patent: Oct. 21, 2008

(54) REAL-TIME CONTENTS EDITING METHOD, SYSTEM, AND PROGRAM

(75) Inventors: Yasuyuki Miura, Tokyo (JP); Michiaki Katsumoto, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 798 days.

(21) Appl. No.: 10/642,647

(22) Filed: Aug. 19, 2003

(65) Prior Publication Data

US 2004/0210823 A1 Oct. 21, 2004

(30) Foreign Application Priority Data

Apr. 21, 2003 (JP) ............................. 2003-115165

(51) Int. Cl.
*G06K 9/36* (2006.01)
(52) U.S. Cl. ...................................... 382/232; 375/240
(58) Field of Classification Search ................ 382/236, 382/239, 232; 375/240.05, 240.07; 709/375, 709/240

See application file for complete search history.

(56) References Cited

U.S. PATENT DOCUMENTS

| | | | | |
|---|---|---|---|---|
| 5,677,969 | A  * | 10/1997 | Auyeung et al. ............. | 382/239 |
| 6,542,549 | B1 * | 4/2003 | Tan et al. ................ | 375/240.26 |
| 6,744,927 | B1 * | 6/2004 | Kato .......................... | 382/239 |

FOREIGN PATENT DOCUMENTS

JP 11-225168 8/1999

OTHER PUBLICATIONS

"Ruff Systems", http://www.cnd.tel.co.jp/products/syo64.hmtl, Apr. 3, 2003.
Akimichi Ogawa, "DV Stream on IEEE 1394 Encapsulated into IP", http://www.sfc.wide.ad.jp/DVTS/, Apr. 3, 2003.
"OhPhone man page", http://www.openh323.org/docs/ohphone.man.html, Apr. 3, 2003.
"FFMpeg Multimedia System", http://ffmpeg.sourceforge.net/, Apr. 3, 2003.
"Coriander Home Page", http://www.tele.ucl.ac.be/PEOPLE/DOUXCHAMPS/ieee1394/coriander/, Apr. 3, 2003.
Yasuyuki Miura et al., "Experiments for Real-time MPEG-4 Visual Encoder", Communications Research Laboratory, (Abstract), pp. 25-30, Nov. 21, 2002.

* cited by examiner

*Primary Examiner*—Matthew C. Bella
*Assistant Examiner*—Claire Wang

(57) ABSTRACT

A real-time contents editing system edits a large number of images and/or voices which are present in a dispersed fashion on the Internet, and distributes the edited images and/or voices to a plurality of users. The system includes a plurality of video cameras, a plurality of distribution modules each adapted to code an input image taken by a corresponding video camera by use of a coding standard which enables coding while selecting one of a plurality of coding algorithms and to distribute the coded input images, a plurality of receiving modules each adapted to receive and display the images, and at least one editing module. Each distribution module changes, in accordance with the performance level of a machine to be used, the kind and use frequency of a video object plane (VOP) to be used, to thereby select a coding algorithm which enables highly efficient compression.

8 Claims, 4 Drawing Sheets

Fig. 4

```
Decide_param(T, R){

Nb=1;

for(Np=2;Np<=Npmax;Np=Np*2)
    if(1/R <Tmin+TIQ+TIDCT
        +(Tc+TM-Pmax)(Np-1)/NpNb+TACDCmax){
            Np=Np/2;
                return(Np,Nb);
    }

Np=Npmax;

for(Nb=2;Nb<=Nbmax;Nb=Nb*2){
    Np=Np/2;
    if(1/R <Tmin+TIQ+TIDCT
    +(Tc+TM-Pmax)(Np-1)/NpNb
    +(Tc+TM-Bmax)(Nb-1)/Nb+TACDCmax){
            Nb=Nb/2;
            return(Np,Nb);
    }
}

Nb=Nbmax;
Np=Npmax/Nbmax;
return(Np,Nb);
}
```

REAL-TIME CONTENTS EDITING METHOD, SYSTEM, AND PROGRAM

BACKGROUND OF THE INVENTION

1. Field of the Invention

The present invention relates to a real-time contents editing method, system, and program which are adapted to edit a large number of images, including live images, and/or voices which are present in a disposed fashion on the Internet and to distribute the edited images and voices to a plurality of users.

2. Description of the Related Art

Broadband networks, which have prevailed in recent years, enable distribution of moving-picture contents of large volumes. Since 2001, a great increase in the number of ADSL (Asymmetric Digital Subscriber Line) subscribers has been paving the way for a broadband environment. At the present time (as of March 2002), in Japan, 7.3% of all households subscribe to ADSL or CATV, and can receive data at a rate of about 1 to 10 Mbps and send data at a rate of about several hundreds kbps. Further, FTTH (Fiber To The Home) promises to prevail in the future; this is expected to enable communications at up to 100 Mbps (maximum speed), as well as exchange (transmission and reception) of bulk moving-picture data between users.

Consequently, many services and tools for distributing images and voices via a broadband network have been proposed. To this end, high-quality image distribution systems utilizing broadband; e.g., Ruff Systems and DVTS, have been proposed. Ruff Systems is a system that distributes, on TCP/IP, non-compressed D1/HDTV pictures and DV streams, the streams being taken by video cameras. Ruff Systems requires a wide band, because non-compressed images and DV images are sued, but can distribute images in high quality. Meanwhile, many existing systems and tools utilize the MPEG moving picture format or the H.323 standard, which copes with narrow bands (see the following publications 3 to 6). These systems and tools (applications) enable a personal computer to receive, via the Internet, images taken by a camera. However, these applications are designed to handle a single moving picture, and therefore, are not suitable for handling a large number of moving pictures.

Other pertinent technologies include the ohphone H.323 endpoint application, the FFmpeg Multimedia System, the Coriander Linux graphical user interface (GUI) for controlling a digital camera through the IEEE 1394 bus, and "Experiments for Real-time MPEG-4 Visual Encoder" by Yasuyuki Miura and Michitetsu Katsumoto, Research Paper of Information Processing Society of Japan, 2002-DPS-100, pp. 25-30, 2002.

SUMMARY OF THE INVENTION

In order to realize live distribution in which pictures taken by a video camera are distributed in real time, a coding process must be carried out as a real-time process. The real-time process must respond to a continuous external input and send back an output within a determined period of time. In a real-time processing system which distributes f frames of a moving picture per second, an editing process and packetization of a bit stream for each frame must be completed within an average of 1/f second, so that the resulting moving pictures can be distributed in real time.

The following approaches are effective for achieving the above-described object.

A coding process is accelerated in order to complete the coding process within a limited period of time.

In order to ensure proper operation on machines which differ in level of performance, a time required to execute a process is monitored and, on the basis of the result of the monitoring, a suitable coding algorithm is selected from a plurality of coding algorithms.

A coding process is carried out in a step-by-step manner. After lapse of a predetermined time, required minimum coding is completed, whereupon an auxiliary coding process of enhanced resolution and compression ratio is carried out. In the event the auxiliary coding process is not completed within a limited period of time, the auxiliary coding process is interrupted, and the result of the coding process in an immediately preceding step is distributed.

On the basis of the above-described concept, in a real-time contents editing system of the present invention, a time required for coding of VOPs (Video Object Planes, which correspond to frames) is measured, and determination as to whether inter-frame compression is to be performed is made on the basis of the measured time and a predetermined average frame rate.

The present inventors propose a real-time contents editing system which provides, for distribution systems dealing with individual streams, an operation for receiving a large number of images and voices as input data, and for editing, coding, and distributing the input data in real time. The present system codes and decodes MPEG-4 video objects (VOs) and editing language codes in a distributed environment and has the following advantageous features over the conventional distribution systems.

(1) Contents editing work using live images from a plurality of remote places is possible.

(2) An image sender or receiver at each place can freely log on or off the system while the system is in operation.

In order to provide contents suitable to individual users needs, many video objects (VOs) are sent to the user side to construct the contents. Therefore, a large number of video objects (VOs) are concentrated on the user side. Consequently, allocating numerous frequency bands to an individual video object (VO) is difficult. Further, when a sender uses an asymmetrical communication service such as ADSL, the upstream bandwidth is narrower than the downstream bandwidth. Therefore, allocating numerous frequency bands to video objects (VOs) is still difficult. If a scheme adapted to transmit bulk data such as D1 non-compressed data or DV compressed data (e.g., Ruff Systems) is adopted, a wide frequency band becomes necessary. Therefore, a system in which a large number of video objects (VOs) are sent/received concurrently requires a huge amount of frequency bands. Consequently, video objects (VOs) must be coded into MPEG-4 video objects (MPEG-4 VOs), which have a high compression ratio and are adapted to various frequency bands. However, MPEG-4 VO coding requires a large CPU power for inter-frame compression, and, therefore, complex coding is difficult to perform in the case where coding of live images is performed by use of a low-performance machine in a real-time environment subjected to a strict restriction on time. For example, when a personal user sends a live image from his or her home, or during a business trip via portable equipment, in some cases only a home-use personal computer or similar equipment can be used. In contrast, when a relatively high performance server machine is used, more complex coding is possible as compared with the case where a low-performance machine is used. Thus, the range of performable processing depends on the performance of a server machine to be used.

In view of the above-described problems, an object of the present invention is to realize real time coding of video objects (VO) into MPEG-4 video objects (VOs) through execution of a coding process corresponding to CPU power.

The present invention provides a real-time contents editing system which receives a plurality of images and/or voices as input data, and integrally performs coding to MPEG-4 video objects (VOs), editing, and distribution in real time. The present system enables provision of contents from a plurality of remote locations, while using live images captured by use of a digital video camera.

The present system is constituted by three kinds of modules; i.e., an editing module, distribution modules, and receiving modules. Each distribution module and each receiving module can freely be connected to or disconnected from the system while the system is in operation. Further, the distribution module can automatically select a coding method that enables high efficiency compression, by changing the type and use frequency of VOP to be employed in accordance with the performance level of a machine to be used.

The real-time contents editing method, system, and program according to the present invention are adapted to edit a large number of images, including live images, and/or voices which are present in a dispersed fashion on the Internet, and to distribute the edited images and/or voices to a plurality of users. The method, system, and program according to the present invention are characterized by provision of a plurality of video cameras each serving as an input device, a plurality of distribution modules each adapted to code an input image taken by a corresponding video camera, by use of a coding standard which enables coding while selecting one of a plurality of coding algorithms and to distribute the coded input image, a plurality of receiving modules each adapted to receive and display the distributed image, and at least one editing module. Each distribution module changes, in accordance with the performance level of a machine to be used, the kind and use frequency of a video object plane (VOP) to be used, to thereby select a coding algorithm which enables highly efficient compression.

BRIEF DESCRIPTION OF THE DRAWINGS

FIG. 4 is a view showing an algorithm for determining appropriate $N_{BVOP}$ and $N_{PVOP}$.

DETAILED DESCRIPTION OF THE PREFERRED EMBODIMENT

<Construction of Real-Time Contents Editing System>

A real-time contents editing system is adapted to edit a large number of images, including live images, and voices, which are present in a dispersed fashion on the Internet, and to distribute the edited images and voices to a plurality of users. The present system is intend to operate irrespective of the kind of a communication network and machine to be employed, to thereby flexibly cope with a variety of existing environments. Consequently, in the present system, the MPEG-4 standard, which enables high compression ratio and can cope with various frequency bands, is used in coding images. Further, a scene description language is used for editing a plurality of images and voices.

Figure 1:
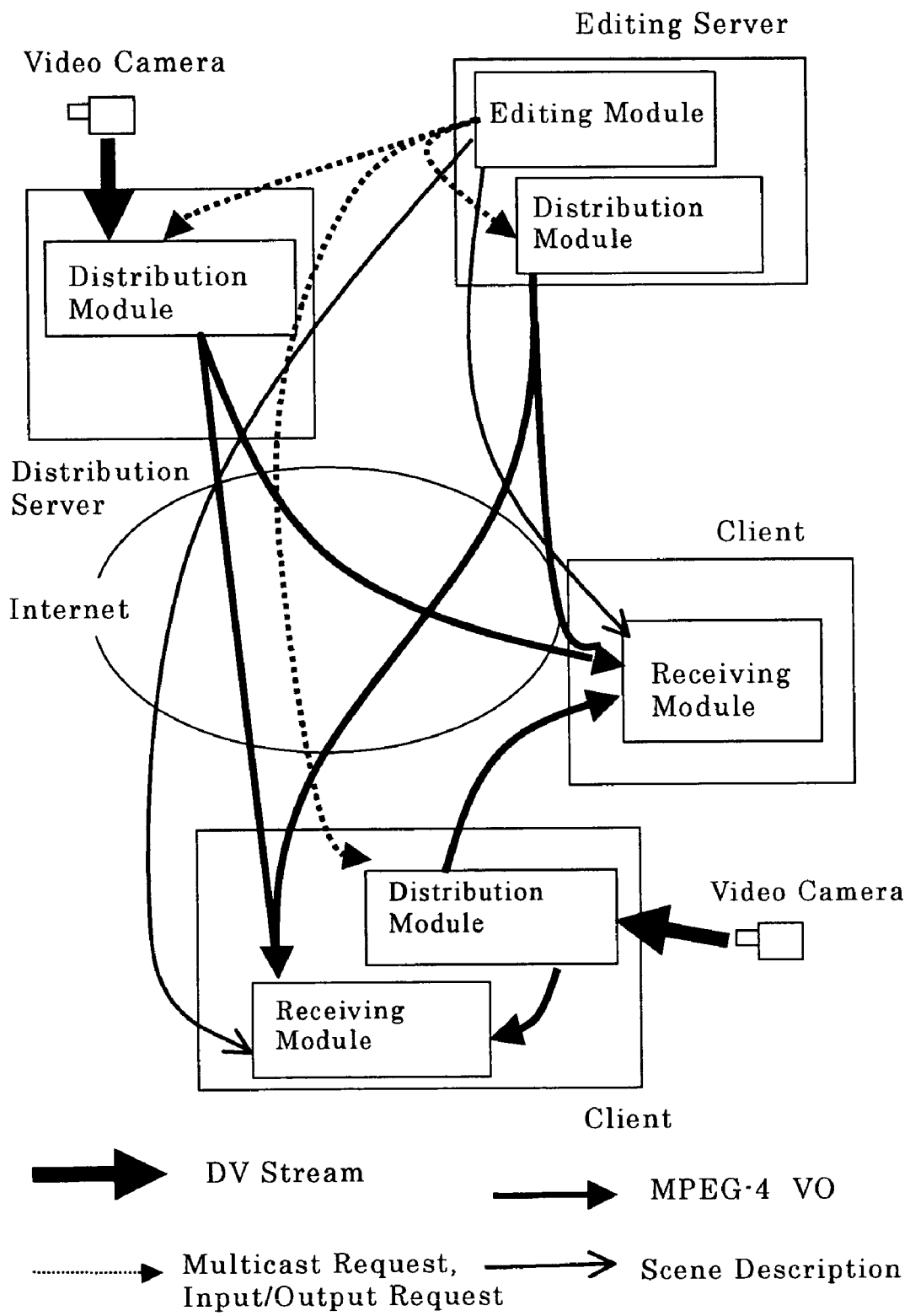
FIG. 1 is a conceptual diagram of a real-time contents editing system according to an embodiment of the present invention.

FIG. 1 is a conceptual diagram of a real-time contents editing system according to an embodiment of the present embodiment. The present system includes a plurality of video cameras each serving as an input device; a plurality of distribution modules each adapted to code input images, which are taken by the associated video camera, and to distribute the coded images; a plurality of receiving modules each adapted to receive and display the images; and at least one editing module. Further, in the illustrated system, a single distribution server, a single editing server, and two clients are interconnected via the Internet. The editing module is disposed in the editing server. One distribution module is disposed in the distribution server, and another distribution module is disposed in the editing server. One receiving module is disposed in each of the clients. One of the clients includes a distribution module in addition to the receiving module. In FIG. 1, DV (Digital Video) streams, MPEG-4 video objects (VOs), multicast requests, input/output requests, and scene description are respectively designated by different kinds of arrows.

Pursuant to an instruction from the operator, the editing module requests the distribution server to multicast the images and voices. Further, the editing module generates and multicasts a scene description language to be sent to the clients. The distribution module codes input images and voices, which are taken in the DV (Digital Video) format from an input device, into MPEG-4 image-voice data and multicasts the image-voice data to a plurality of clients via the Internet by means of personalized media stream distribution. In each client having a receiving module, moving pictures are displayed on the basis of a plurality of kinds of MPEG-4 image-voice data and a scene description. Each video camera and a corresponding apparatus including a distribution module are interconnected via an IEEE1394 port. IEEE1394 ports are widely used in many kinds of DV equipment, and support isochronous transmission in which data is sent/received at high speed and at constant intervals. Therefore, IEEE1394 ports are suitable for sending/receiving image and voice data.

Each of the distribution module, the receiving module, and the editing module may assume an arbitrary form. For example, each of the distribution module, the receiving module, and the editing module may be disposed as a program on a general-purpose server machine or may be operated on a home-use personal computer. Further, each of the distribution module, the receiving module, and the editing module may assume the form of a dedicated PC card and serve as an add-on system for a personal computer.

<DV-MPEG Converter in Distribution Module>

1) Configuration

In a real-time-processable contents editing system, a sender can distribute an image, while using a digital video camera and also using a personal computer at hand as a distribution server. Alternatively, the sender can distribute an image from a meeting room of the sender s office or any other place, while using a high-performance server machine. In the former case, occasionally a lower-performance personal computer is used as compared with that used in the latter case and, therefore, a complex coding process is difficult to execute. In the latter case, a more complex coding process can be executed, but the type of usable coding depends on the specifications of a server machine to be used. Further, the type of usable coding is restricted by the frequency band of a communication line at the sender side. If an asymmetrical line such as ADSL is used on the transmission side, the upstream transmission speed is several hundreds kbps, which is considerably slow as compared with the downstream transmission speed. For these reasons, coding suitable for the environment at the sender side must be performed.

On many occasions, at least a predetermined frame rate must be maintained in order to maintain quality of moving pictures. Consequently, the present system is assumed to be subjected to a constraint of maintaining a frame rate higher than R(frames/s) (R: a predetermined number).

In the case where coding is executed with use of only I-VOP, motion compensation relevant to inter-frame compression is unnecessary and, therefore, images that have been coded immediately previously are unnecessary. As a consequence, inverse quantization and inverse DCT (discrete cosine transformation) for coded images can be omitted and, therefore, the coding time can be shortened considerably (see above-mentioned publication 6). However, this raises a problem that coding increases the quantity of codes, and a form of coding is fixed; i.e., coding of an arbitrary form is difficult to execute. Notably, I-VOP represents a VOP obtained through a process of dividing input images into blocks, performing DCT for each block, quantizing DCT coefficients, and subjecting the quantized DCT coefficients to variable-length coding (intra-coding).

With regard to the above-mentioned problem that the quantity of codes increases, the quantity of codes can be adjusted, because in the MPEG-4 standard the quantizing scale can be set freely. However, the image quality is degraded while the quantizing scale is set to a larger value. Therefore, if a host computer which includes a converter has a reserve of CPU power, inter-frame compression is desirably carried out. For this purpose, there is configured a converter capable of coding VOPs, including P-VOP (predictive VOP) and B-VOP (bi-directional predictive VOP), for which inter-frame-compression can be performed.

Figure 2:
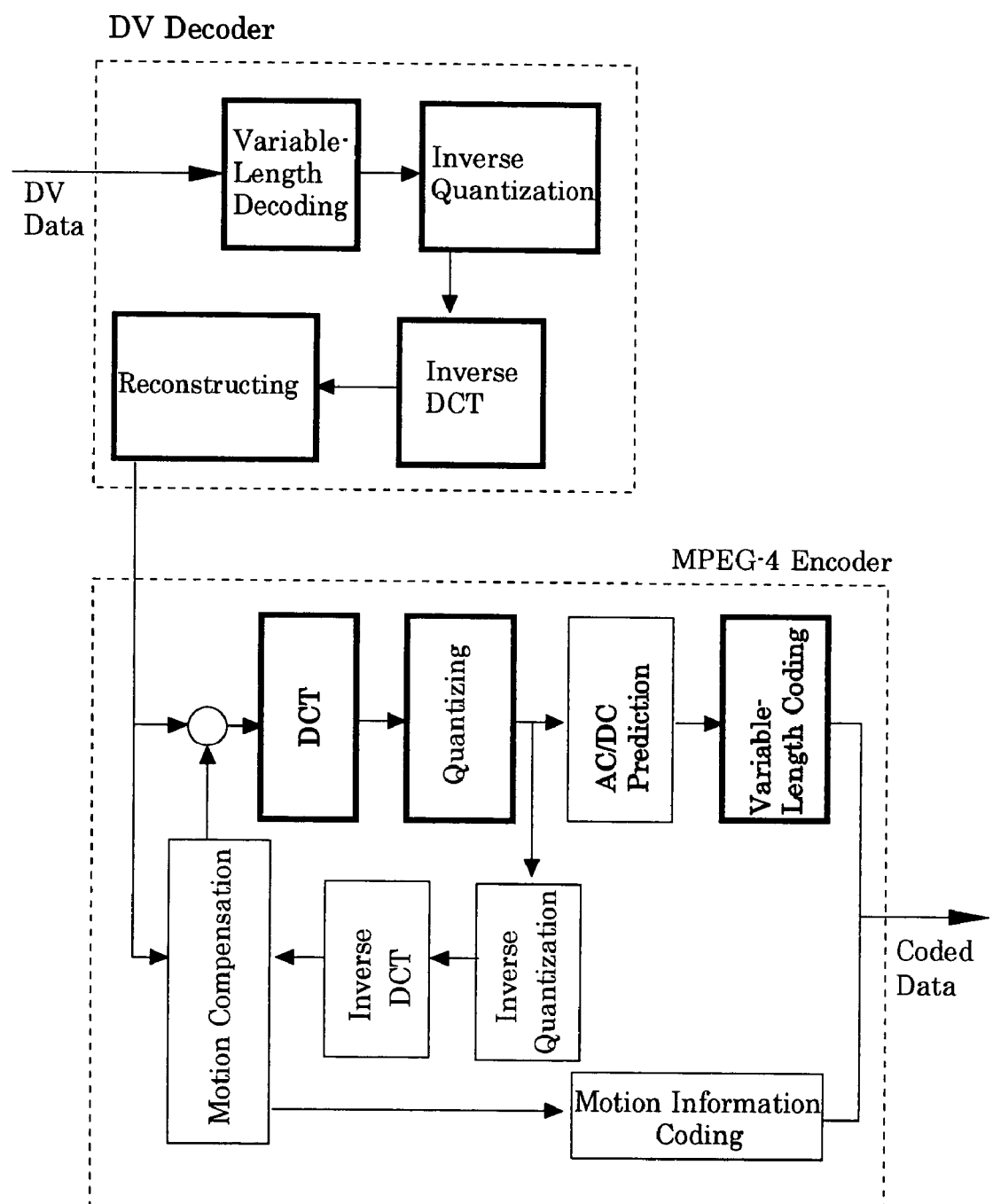
FIG. 2 is a block diagram showing the configuration of a converter.

FIG. 2 shows the configuration of a converter that converts DV data into MPEG coded data. The configuration and operation of the converter have been known. In the present invention, coding processes shown in FIG. 2 are classified or divided into basic processes and auxiliary processes. The basic processes are minimum coding processes to be performed at all times. The auxiliary processes are coding processes to be performed only when the converter has sufficient time to perform the auxiliary processes. In FIG. 2, thick-frame blocks indicate basic processes; i.e., "variable-length decoding," "inverse quantization," "inverse DTC," "reconstruction," "DCT," "quantization," and "variable length coding." These basic processes are minimum processes that are essential when every VOP is I-VOP. Meanwhile, the remaining processes; i.e., "AC/DC prediction," "inverse quantization," "inverse DCT," "motion compensation," and "motion information coding" are defined as auxiliary processes. Among these auxiliary processes, "AC/DC prediction" is used for saving the code quantity of I-VOPs or P-VOPs, and the remaining auxiliary processes are used for inter-frame compression of P-VOPs or B-VOPs.

2) Coding Process in Distribution Module

Figure 3:
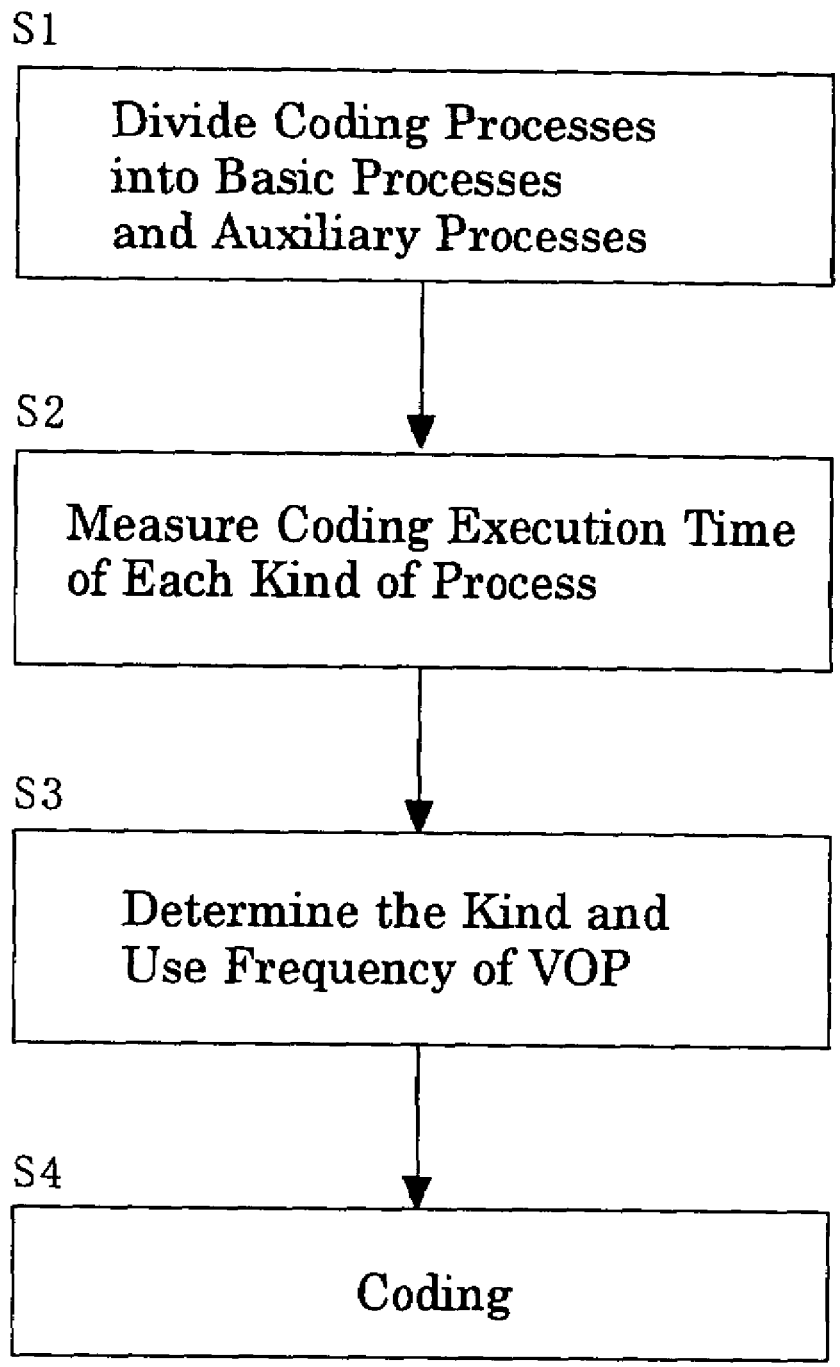
FIG. 3 is a flowchart illustrating a coding process in a distribution module.

In the illustrated system, in order to determine whether or not P-VOP and B-VOP should be used and to determine the use frequency of P-VOP and B-VOP, an average coding time for 1 VOP is predicted through measurement of coding execution times of various processes, and a determination is made in accordance with a determined algorithm. FIG. 3 is a flowchart illustrating a coding process in such a distribution module.

Step S1:

As described above, coding processes are divided into basic processes and auxiliary processes.

Step S2:

At the startup of the distribution module, an input image is coded in the order of IBPBIBPBIBPB . . . , and for each VOP type the period of time required to process a plurality of VOPs is measured. An average processing time required to perform each kind of process is thereby measured. I, B, and P represent I-VOP, B-VOP, and P-VOP, respectively.

In this processing time measurement, processing time per VOP is measured for "variable-length decoding," "inverse quantization," "inverse DCT," and "block reconstruction" in a DV decoder; and for "DCT," "quantization," "variable-length coding," "AC/DC prediction," "inverse quantization," "inverse DCT," "motion compensation," and "motion information coding" in an MPEG-4 encoder. Thus, average processing times of the individual processes are obtained. Among these processes, "motion compensation" provides different processings between P-VOP and B-VOP, and therefore, its processing time greatly changes between P-VOP and B-VOP. Therefore, the average processing time of "motion compensation" is obtained for each of P-VOP and B-VOP. In this manner, the coding execution times of the individual processes are measured.

The time necessary for coding each VOP will now be described in more detail. When coding of all VOPs is executed by sole use of I-VOP, coding can be executed in the shortest time. However, when coding is executed by use of P-VOP or B-VOP, reference images for performing compensation on the basis of preceding and succeeding VOPs must be prepared. This necessitates inverse quantization and inverse DCT. Therefore, the period of time necessary for coding I-VOP depends on whether or not P-VOP or B-VOP are used in the same VO. The individual parameters necessary for evaluation are defined as follows:

$T_{min}$: time required for minimum coding
$T_{ACDC}(n)$: time required for AC/DC prediction of n-th VOP
$T_{IQ}$: time required for inverse quantization
$T_{IDCT}$: time required for inverse DCT
Tc: time required for motion information coding
$T_M(n)$: time required for motion compensation of n-th VOP Other than $T_M$ and $T_{ACDC}$, each of the above-mentioned values assumes a fixed value which is determined in accordance with the specifications of a machine to be used and the size of an object image. By contrast, $T_M$ is a variable value that can be set freely, because even when a motion compensation process is interrupted, coding can be performed by use of the result obtained immediately before interruption. Further, $T_{ACDC}$ is also a variable value, because determination as to whether or not AC/DC prediction should take place can be made for every frame. Specifically, $T_M$ for P-VOP assumes any value within the range of $0 \leq T_M(n) \leq T_{M-Pmax}$; $T_M$ for B-VOP assumes any value within the range of $0 \leq T_M(n) \leq T_{M-Bmax}$; and $T_{ACDC}$ assumes a value of 0 or $T_{ACDCmax}$. $T_{M-Pmax}$ represents a period of time required for performing motion compensation for all macro blocks in P-VOP; $T_{M-Bmax}$ represents a period of time required for performing motion compensation for all macro blocks in B-VOP; and $T_{ACDCmax}$ represents a period of time required for AC/DC prediction for 1 VOP when the AC/DC prediction is executed. Each of the above-mentioned parameters can be obtained by measuring the following various processing times and calculating their average values.

$T_{min}$: total of processing times of "variable-length decoding," "inverse quantization," "inverse DCT," and "block reconstruction" in the DV decoder; and "DCT," "quantization," and "variable-length coding" in the MPEG-4 encoder $T_{ACDCmax}$: processing time of "AC/DC prediction"

$T_{IQ}$: processing time of "inverse quantization" in the MPEG-4 encoder $T_{IDCT}$: processing time of "inverse DCT" in the MPEG-4 encoder Tc: processing time of "motion information coding"

$T_{M-Pmax}$: processing time of "motion compensation" for P-VOP $T_{M-Bmax}$: processing time of "motion compensation" for B-VOP Notably, the processing time of "motion compensation" is measured when "motion compensation" is executed completely.

The coding time of each VOP is as follows:

Coding of I-VOP:

If P-VOP and B-VOP are not used in other VOPs, $$T(n)=T_{min}+T_{ACDC}(n) \quad (1)$$

If P-VOP or B-VOP is used in other VOPs, $$T(n)=T_{min}+T_{ACDC}(n)+T_{IQ}+T_{IDCT} \quad (2)$$

Coding of P-VOP or B-VOP:

$$T(n)=T_{min}+T_{ACDC}(n)+T_{IQ}+T_{IDCT}+Tc+T_M(n) \quad (3)$$

Here, the number of occurrences of I-VOPs in N VOPs is represented by $N_{IVOP}$; the number of occurrences of P-VOPs in N VOPs is represented by $N_{PVOP}$; and the number of occurrences of B-VOPs in N VOPs is presented by $N_{BVOP}$. In this case, the total coding time of N VOPs is calculated as follows:

$$\begin{aligned}Ttotal&=\Sigma_{I\text{-}VOP}T(n)+\Sigma_{P\text{-}VOP}T(n)+\Sigma_{B\text{-}VOP}T(n)=N_{IVOP}\\&(T_{min}+T_{IQ}+T_{IDCT})+\Sigma_{I\text{-}VOP}T_{ACDC}(n)+N_{PVOP}\\&(T_{min}+T_{IQ}+T_{IDCT}+Tc)+\Sigma_{P\text{-}VOP}(T_{ACDC}(n)+T_M\\&(n))+N_{BVOP}(T_{min}+T_{IQ}+T_{IDCT}+Tc)+\Sigma_{B\text{-}VOP}(T_{ACDC}\\&(n)+T_M(n))=N\times(T_{min}+T_{IQ}+T_{IDCT})+(N_{PVOP}+\\&N_{BVOP})Tc+\Sigma_{all\text{-}VOP}T_{ACDC}(n)+\Sigma_{P\text{-}VOP}T_M(n)+\\&\Sigma_{B\text{-}VOP}T_M(n)\end{aligned} \quad (4)$$

The average coding time for 1 frame at that time is:

$$\begin{aligned}Tave&=Ttotal/N=T_{min}+T_{IQ}+T_{IDCT}+Tc(N_{PVOP}+N_{BVOP})/\\&N+(\Sigma_{all\text{-}VOP}T_{ACDC}(n)+\Sigma_{P\text{-}VOP}T_M(n)+\Sigma_{B\text{-}VOP}T_M\\&(n))/N\end{aligned} \quad (5)$$

Since the values of $T_M$ and $T_{ACDC}$ are variable, each term that includes the operator $\Sigma$ in formula (5) can be freely determined. The value of $T_{M-Pmax}$ is about several times the value of $T_{ACDCmax}$, and the value of $T_{M-Bmax}$ is about several times the value of $T_{M-Pmax}$. Therefore, the coding time is preferentially allocated to AC/DC prediction, motion compensation of P-VOP, and motion compensation of B-VOP, in this order. Practically, since the time ratio of AC/DC prediction to the entire coding is small, in the following description, the AC/DC prediction is presumed to be executed.

Step S3:

The kind and use frequency of VOP to be used are determined in accordance with a VOP determination algorithm, from the average processing time measured in step 2.

A target average coding time for 1 frame is 1/R, where R is a target frame rate. According to formula (5), the average coding time when motion compensation is completely executed using $N_{PVOP}$ P-VOPs in N VOPs is $$Tave=T_{min}+T_{IQ}+T_{IDCT}+(Tc+T_{M-Pmax})N_{PVOP}/N+T_{ACDCmax} \quad (6)$$

Therefore, the minimum condition for using $N_{PVOP}$ P-VOPs in N VOPs is $$1/R \geq T_{min}+T_{IQ}+T_{IDCT}+(Tc+T_{M-Pmax})N_{PVOP}/N+T_{ACDCmax} \quad (7)$$

Further, when motion compensation is completely performed for all micro blocks in P-VOP and B-VOP by use of $N_{PVOP}$ P-VOPs and $N_{BVOP}$ B-VOPs in N VOPS, an average coding time is $$Tave=T_{min}+T_{IQ}+T_{IDCT}+(Tc+T_{M-Pmax})N_{PVOP}/N+(Tc+T_{M-Bmax})N_{BVOP}/N+T_{ACDCmax} \quad (8)$$

Therefore, a minimum condition for using $N_{PVOP}$ P-VOPs and $N_{BVOP}$ B-VOPs in N VOPs is $$1/R \geq T_{min}+T_{IQ}+T_{IDCT}+(Tc+T_{M-Pmax})N_{PVOP}/N+(Tc+T_{M-Bmax})N_{BVOP}/N+T_{ACDCmax} \quad (9)$$

Practically, the ratio between VOPs cannot be changed freely, and the ratio is determined by changing the number of P-VOPs sandwiched between two I-VOPs or the number of B-VOPs sandwiched between any combination of I-VOPs and P-VOPs (hereinafter referred to as "between two I-VOPs or P-VOPs"). If the sum of the number of P-VOPs sandwiched between two successive I-VOPs and 1 is defined as Np and the sum of the number of B-VOPs sandwiched between two successive I-VOPs or P-VOPs and 1 is defined as Nb, the number of VOPs of each kind included in N successive VOPs is expressed as follows:

$$N_{IVOP}=N/NpNb \quad (10)$$

$$N_{PVOP}=(Np-1)N/NpNb \quad (11)$$

$$N_{BVOP}=(Nb-1)N/Nb \quad (12)$$

Therefore, formulae (7) and (9) are expressed as follows:

$$1/R \geq T_{min}+T_{IQ}+T_{IDCT}+(Tc+T_{M-Pmax})(Np-1)/NpNb+T_{ACDCmax} \quad (13)$$

$$1/R \geq T_{min}+T_{IQ}+T_{IDCT}+(Tc+T_{M-Pmax})(Np-1)/NpNb+(Tc+T_{M-Bmax})(Nb-1)/Nb+T_{ACDCmax} \quad (14)$$

An algorithm for determining appropriate values of $N_{BVOP}$ and $N_{PVOP}$ is shown in FIG. 4. Inputs T and R of the algorithm represent a processing time and a target frame rate, respectively, of each coding process. T includes all coding processing times, and is expressed by T={$T_{min}$, $T_{ACDC}$, $T_{IQ}$, $T_{IDCT}$, Tc, $T_{M-Pmax}$, $T_{M-Bmax}$}.

First, the determination of formula (13) is performed under the conditions that $N_{BVOP}=1$ and $N_{PVOP}=2$. If motion compensation can be performed for all VOPs, the determination is repeated, while the value of $N_{PVOP}$ is doubled every time. This determination is continued until the value of $N_{PVOP}$ reaches a preset maximum value $N_{PVOPmax}$. During the determination, if conditions that fail to satisfy formula (13) are obtained, the value of $N_{PVOP}$ is restored to an immediately preceding value, and coding is performed by use of I-VOPs and P-VOPs.

If motion compensation can be performed for all VOPs even when the value of $N_{PVOP}$ reaches $N_{PVOPmax}$, $N_{BVOP}$ is set to 2, and the determination of formula (14) is repeated, while the value of $N_{BVOP}$ is doubled every time. This determination is continued until the value of $N_{BVOP}$ reaches $N_{BVOPmax}$. During the determination, if conditions that fail to satisfy formula (14) are obtained, the value of $N_{BVOP}$ is restored to an immediately preceding value, and coding is performed by use of all kinds of VOPs. At that time, the number of I-VOPs decreases as $N_{BVOP}$ is increased. Therefore, in order to maintain a constant I-VOP ratio, $N_{PVOP}$ is halved each time $N_{BVOP}$ is doubled.

Step S4:

Coding is continued in accordance with the kind and use frequency of VOP determined in step S3. According to the present invention, a system capable of editing and distributing a plurality of images and voices is constituted by three kinds of modules; i.e., an editing module, distribution modules, and receiving modules. In this system, a coding method which enables the highest possible compression efficiency can be automatically selected by changing the kind of VOP to be employed in accordance with the performance of a machine which uses the distribution module.

What is claimed is:

1. A real-time contents editing method for editing a large number of images, including live images or voices which are present in a dispersed fashion on the Internet, and distributing the edited images or voices to a plurality of users, the method comprising:

providing a plurality of video cameras each serving as an input device, a plurality of distribution modules each adapted to code an input image taken by a corresponding video camera, by use of a coding standard which enables coding while selecting one of a plurality of coding algorithms and to distribute the coded input image, a plurality of receiving modules each adapted to receive and display the image or voice distributed from the distribution modules, and at least one editing module that requests the distribution modules to distribute the image or voice to the receiving modules;

determining the performance level of a machine to be used through measurement, in the system, of a time required for coding of a video object plane (VOP); and causing each distribution module to change, in accordance with the performance level, a kind and use frequency of a video object plane (VOP) to be used, to thereby select a coding algorithm which enables highly efficient compression.

2. A real-time contents editing method according to claim 1, wherein processes for coding the input image are divided into basic processes and auxiliary processes; a coding execution time of each of the basic and auxiliary processes is measured; and the kind and use frequency of a video object plane (VOP) to be used is changed on the basis of results of the measurement.

3. A real-time contents editing system for editing a large number of images, including live images or voices which are present in a dispersed fashion on the Internet, and distributing the edited images or voices to a plurality of users, the system comprising:

a plurality of video cameras each serving as an input device;

a plurality of distribution modules each adapted to code an input image taken by a corresponding video camera, by use of a coding standard which enables coding while selecting one of a plurality of coding algorithms and to distribute the coded input image;

a plurality of receiving modules each adapted to receive and display the image or voice distributed from the distribution modules; and at least one editing module that requests the distribution modules to distribute the image or voice to the receiving modules, wherein the performance level of a machine to be used is determined through measurement, in the system, of a time required for coding of a video object plane (VOP), and wherein each distribution module changes, in accordance with the performance level, a kind and use frequency of a video object plane (VOP) to be used, to thereby select a coding algorithm which enables highly efficient compression.

4. A real-time contents editing system according to claim 3, wherein the coding standard is the MPEG-4 standard.

5. A real-time contents editing system according to claim 3, wherein the editing module is adapted to request a distribution server to multicast the images and/or voices, and is adapted to generate and multicast a scene description language to be transmitted to a plurality of clients.

6. A real-time contents editing system according to claim 3, wherein the coding process according to the selected coding algorithm is carried out in a step-by-step manner such that required minimum coding is completed after lapse of a predetermined time, whereupon an auxiliary coding process of enhanced resolution and compression rate is carried out; and if a relevant auxiliary coding process is not completed when a limited period of time has elapsed, the auxiliary coding process is interrupted, and the result of the coding process in an immediately preceding step is distributed.

7. A computer-readable medium storing a real-time contents editing program for editing a large number of images, including live images or voices which are present in a dispersed fashion on the Internet, and distributing the edited images or voices to a plurality of users, the program being adapted to a system comprising a plurality of video cameras each serving as an input device, a plurality of distribution modules each adapted to code an input image taken by a corresponding video camera by use of a coding standard which enables coding while selecting one of a plurality of coding algorithms and to distribute the coded input image, a plurality of receiving modules each adapted to receive and display the image or voice distributed from the distribution modules, and at least one editing module that requests the distribution modules to distribute the image or voice to the receiving modules, the program causing a computer to execute a method comprising:

determining the performance level of a machine to be used through measurement, in the system, of a time required for coding of a video object plane (VOP); and causing each distribution module to change, in accordance with the performance level, a kind and use frequency of a video object plane (VOP) to be used, to thereby select a coding algorithm which enables highly efficient compression.

8. An apparatus, comprising:

a plurality of video units as input devices, the video units collecting data containing at least one of voice or image data;

a plurality of distribution units, each distribution unit being adapted to code input data captured by a respective video unit, the coding units using one of a plurality of coding algorithms to code the data;

plurality of receiving units, each receiving unit adapted to operably present the coded data received from a respective distribution unit; and an editing unit that requests the distribution units to distribute coded data to the respective receiving unit, the editing unit determining the performance level of a distribution unit by measuring the time required for coding of a video object plane and, in response thereto, causing the distribution unit to select a coding algorithm in accordance with the performance level, thereby facilitating efficient data compression.

* * * * *

UNITED STATES PATENT AND TRADEMARK OFFICE
CERTIFICATE OF CORRECTION

| | |
|---|---|
| PATENT NO. | : 7,440,623 B2 |
| APPLICATION NO. | : 10/642647 |
| DATED | : October 21, 2008 |
| INVENTOR(S) | : Yasuyuki Miura et al. |

It is certified that error appears in the above-identified patent and that said Letters Patent is hereby corrected as shown below:

Column 10, Line 54, change "plurality" to --a plurality--.

Signed and Sealed this

Sixth Day of January, 2009

JON W. DUDAS
*Director of the United States Patent and Trademark Office*